US006291602B1

(12) United States Patent
Koch et al.

(10) Patent No.: US 6,291,602 B1
(45) Date of Patent: Sep. 18, 2001

(54) ETHYLENE POLYMER AND PROCESSES FOR OBTAINING IT

(75) Inventors: Benoît Koch, Hannut; Olivier Lhost, Mons, both of (BE)

(73) Assignee: Solvay Polyoléfins Europe - Belgium, Brussels (BE)

( * ) Notice: Subject to any disclaimer, the term of this patent is extended or adjusted under 35 U.S.C. 154(b) by 0 days.

(21) Appl. No.: 09/285,069

(22) Filed: Apr. 2, 1999

Related U.S. Application Data

(62) Division of application No. 08/634,623, filed on Apr. 18, 1996, now Pat. No. 6,201,078.

(30) Foreign Application Priority Data

Apr. 28, 1995 (BE) .................................................. 09500397

(51) Int. Cl.[7] ...................................................... C08F 2/00
(52) U.S. Cl. .............................. 526/65; 526/66; 526/106; 526/114; 526/130; 526/348
(58) Field of Search ................................ 526/65, 66, 106, 526/130, 348, 114

(56) References Cited

U.S. PATENT DOCUMENTS

| 4,109,071 | 8/1978 | Berger et al. ........................ 526/114 |
| 4,547,551 | * 10/1985 | Bailey et al. ........................ 525/240 |
| 4,735,931 | * 4/1988 | McDaniel et al. ................... 502/107 |
| 5,149,738 | * 9/1992 | Lee et al. ............................... 525/53 |
| 5,260,384 | * 11/1993 | Morimoto et al. ................... 525/240 |
| 5,478,898 | * 12/1995 | Standaert ................................ 526/65 |
| 5,849,852 | * 12/1998 | Koch et al. .............................. 526/96 |
| 6,063,878 | * 5/2000 | Debras et al. .......................... 526/64 |

FOREIGN PATENT DOCUMENTS

| 840378 | * | 4/1976 | (BE) . |
| 0100843 | * | 2/1984 | (EP) . |
| 0134427 | * | 3/1985 | (EP) . |
| 0273284 | * | 7/1988 | (EP) . |
| 273284 | * | 7/1988 | (EP) . |
| 0572003 | * | 12/1993 | (EP) . |
| 0603935 | * | 6/1994 | (EP) . |
| 603935 | * | 6/1994 | (EP) . |
| WO 94/26790 | * | 11/1994 | (WO) . |
| WO 94/26791 | * | 11/1994 | (WO) . |
| 94/26790 | | 11/1994 | (WO) . |
| 94/26791 | | 11/1994 | (WO) . |

* cited by examiner

*Primary Examiner*—David W. Wu
*Assistant Examiner*—Ling-Su Choi
(74) *Attorney, Agent, or Firm*—Marina V. Schneller; Venable

(57) ABSTRACT

Ethylene polymer having a blow-up ratio ($R_B$) of at least 1.4, a resistance to crazing under stress (ESCR) of at least 55 h and a melt index ($MI_5$) of at least 0.2 g/10 min.

Processes for obtaining this ethylene polymer using different catalytic systems, the first based on titanium and zirconium used in a polymerization in two reactors; the second consisting of a mixture of a titanium catalyst and a titanium and zirconium catalyst, used in a polymerization in two reactors; the third based on chromium on a support comprising at least two constituents chosen from silica, alumina and aluminium phosphates, used in a polymerization in a single or in two reactors.

18 Claims, No Drawings

ETHYLENE POLYMER AND PROCESSES FOR OBTAINING IT

CROSS-REFERENCE TO RELATED APPLICATION

This is a divisional application of Ser. No. 08/634,623, filed Apr. 18, 1996, now U.S. Pat. No. 6,201,078 which is relied upon and expressly incorporated by reference herein.

The present invention relates to ethylene polymers having an advantageous combination of characteristics which makes them particularly suitable for use by extrusion and by extrusion blow-moulding in order to manufacture articles (for example tubes) which have excellent mechanical properties and, in particular, high resistance to crazing under stress. The invention also relates to various processes for obtaining these ethylene polymers.

It is generally known that resins having a high elongational viscosity (which is reflected by a high blow-up ratio) lend themselves particularly well to use by extrusion and by extrusion blow-moulding. For example, Belgium patent BE 84,0378 (Solvay & Co.) describes polyethylenes obtained by polymerization in a single reactor in the presence of a catalytic solid which is prepared by reacting an oxygen-containing organomagnesium compound with an oxygen-containing organotitanium compound and an oxygen-containing organozirconium compound, and by subsequently treating the reaction product thus obtained with an aluminium halide. The known polyethylenes have a high blow-up ratio. However, their mechanical properties are such that the resistance to crazing under stress of tubes extruded from these polyethylenes is low.

Moreover, polyethylenes of improved mechanical properties, and in particular of high resistance to crazing under stress, are known. For example, patent application EP 603935 (Solvay) discloses ethylene polymers obtained by polymerization in at least two reactors in series, in the presence of a titanium catalyst. The ethylene polymers thus obtained have good mechanical properties (high resistance to crazing under stress). However, the ethylene polymers have a low blow-up ratio.

The present invention is directed towards overcoming the abovementioned drawbacks by providing a novel ethylene polymer having both a high blow-up ratio and a high resistance to crazing under stress, which is particularly suitable for use by extrusion and by extrusion blow-moulding.

Consequently, the invention relates to an ethylene polymer having a blow-up ratio ($R_B$) of at least 1.4, a resistance to crazing under stress (ESCR) of at least 55 h and a melt index ($MI_5$) of at least 0.2 g/10 min.

One of the essential characteristics of the ethylene polymer according to the invention thus lies in the combination of a high blow-up ratio with a high resistance to crazing under stress.

The blow-up ratio of the ethylene polymer according to the invention is measured by extruding, at 190° C. and at a rate gradient of 100 s$^{-1}$, the ethylene polymer through a die 30 mm in length and 2 mm in diameter at a constant rate of extrusion, and by measuring how far it is necessary to displace the piston in order to extrude a rod 70 mm in length. The blow-up ratio is defined by the relationship $R_B = 0.5707 \sqrt{e}$, in which e represents the displacement of the piston expressed in mm. The cylinder and the piston of the rheometer used for this measurement satisfy the criteria of that used to measure the melt index according to ASTM standard D1238 (1986).

The resistance to crazing under stress of the ethylene polymer is measured according to the following procedure. Ten plates 125 mm×12.7 mm×3.2 mm in size are pressed from a sheet of ethylene polymer. Two notches are made therein, the first 60 mm from one end of the plate and the second 15 mm from the other end of the plate. The notched plates are subjected to a constant flexural force of 7.36 N, corresponding to a stress less than the stress at the plastic flow threshold, and are simultaneously immersed in a surfactant solution comprising 3 ml of nonylphenoxy-poly (ethyleneoxy)ethanol per liter of water at a temperature of 60° C. The time after which the test samples break is noted and the average time corresponding to the breaking of 50% of the test samples is calculated.

For the purposes of the present invention, the expression "ethylene polymers" is understood to denote ethylene homopolymers as well as copolymers of ethylene with at least one co-monomer. Ethylene copolymers are the most advantageous. Co-monomers which may be mentioned are alpha-olefins containing from 3 to 8 carbon atoms. Butene, hexene and mixtures thereof are preferred. The co-monomer content in the ethylene copolymer is generally at least 0.1 t by weight, in particular at least 0.5 % by weight, values of at least 1% by weight being favourable. The co-monomer content is usually not more than 10% by weight, more precisely not more than 8% by weight, values of not more than 5% by weight being the most common.

The ethylene polymers according to the invention usually have a melt index, measured at 190° C. and at a 5 kg load according to ASTM standard D 1238-Condition P (1986) (referred to hereinbelow as $MI_5$) of at least 0.3 g/10 min, in particular of at least 0.6 g/10 min. The $MI_5$ values generally do not exceed 10 g/10 min, usually do not exceed 5 g/10 min and more especially do not exceed 2 g/10 min.

Ethylene polymers according to the invention which are preferred are, in addition, characterized by a dynamic viscosity η, expressed in dPa s and measured at a rate gradient of 100 s$^{-1}$ at 190° C., such that the ratio $$\frac{\log(177470/MI_5) - \log \eta}{2 - \log(2.53 \times MI_5)}$$

is at least 0.55. Preferably, this ratio is at least 0.59, values of at least 0.61 being particularly advantageous. In most cases, this ratio is not more than 0.73 and usually not more than 0.70.

The ethylene polymers according to the invention usually have a standard density, measured according to ISO standard 1183 (1987), of at least 945 kg/m$^3$, in particular of at least 950 kg/m$^3$, values of at least 952 kg/m$^3$ being preferred. The standard density generally does not exceed 965 kg/m$^3$, and more precisely does not exceed 960 kg/m$^3$, values of not more than 958 kg/m$^3$ being the most preferred.

The invention also relates to various processes for the preparation of the ethylene polymer described above.

In a first process for the preparation of ethylene polymer according to the invention, a single catalytic solid containing titanium and zirconium as active elements is used in a polymerization in two reactors arranged in series.

The first preparation process consists more particularly in polymerizing the ethylene optionally with one or more co-monomers in two reactors in series in the presence of a catalytic solid comprising titanium and zirconium in a Zr/Ti molar ratio of at least 2, and in the presence of a co-catalyst, the first reactor being fed with ethylene, optionally with co-monomer and/or with hydrogen, with catalytic solid and with co-catalyst, the reaction medium of the first reactor being transferred into the second reactor, and the second reactor also being fed with ethylene and optionally with co-monomer. Preferably, hydrogen is introduced into at least one of the two reactors.

The catalytic solid used in the first process according to the invention advantageously comprises from 0.5 to 10% by weight of titanium (preferably from 1 to 6% by weight), from 5 to 40% by weight of zirconium (preferably from 10 to 25% by weight), the Zr/Ti molar ratio being at least 2, from 20 to 80% by weight of halogen (preferably from 40 to 60% by weight), from 1 to 30% by weight of magnesium (preferably from 5 to 15% by weight), and from 0.5 to 10% by weight of aluminium (preferably from 1 to 3% by weight). The remainder consists of residual organic groups derived from the reactants used, in particular alkoxy and alkyl groups.

The halogen is preferably chlorine. The Zr/Ti ratio in the catalytic solid is preferably at least 2.5, values of at least 3 being particularly preferred. The Zr/Ti ratio usually does not exceed 10 and more precisely does not exceed 8, values of not more 6 being preferred.

In a second process for the preparation of ethylene polymer according to the invention, a mixture of two catalytic solids is used, the first containing a single active element, namely titanium, and the second containing two active elements, namely titanium and zirconium, in a polymerization in two reactors in series, and a co-catalyst, the first reactor being fed with ethylene, optionally with co-monomer and/or with hydrogen, with first and second catalytic solids and with cocatalyst, the reaction medium of the first reactor being transferred into the second reactor, and the second reactor also being fed with ethylene and optionally with co-monomer and/or with hydrogen.

The second process for the preparation of the ethylene polymers in accordance with the invention consists more particularly in polymerizing the ethylene optionally with one or more co-monomers in two reactors in series, in the presence of a first catalytic solid consisting essentially of from 10 to 30% by weight of titanium, from 20 to 60% by weight of halogen, from 0.5 to 20% by weight of magnesium and from 0.1 to 10% by weight of aluminium, of a second catalytic solid consisting essentially of from 0.5 to 10% by weight of titanium, from 5 to 40% by weight of zirconium, from 20 to 80% by weight of halogen, from 1 to 30% by weight of magnesium and from 0.5 to 10% by weight of aluminium. Preferably, hydrogen is introduced into at least one of these two reactors.

The two catalytic solids may optionally be mixed prior to use in the polymerization process. The prior mixing then advantageously takes place at room temperature.

The first catalytic solid preferably consists essentially of from 15 to 20% by weight of titanium, from 30 to 50% by weight of halogen, from 1 to 10% of magnesium and from 0.5 to 5% by weight of aluminium. The remainder consists of residual organic groups derived from the reactants used, in particular alkoxy and alkyl groups. The halogen is usually chlorine.

Usually, the second catalytic solid consists essentially of from 1 to 6% by weight of titanium, from 10 to 25% by weight of zirconium, from 40 to 60% by weight of halogen, from 5 to 15% by weight of magnesium and from 1 to 3% by weight of aluminium. The remainder consists of residual organic groups derived from the reactants used, in particular alkoxy and alkyl groups. In most cases, the halogen is chlorine.

In the second process according to the invention, the two catalytic solids are generally used in amounts such that the molar ratio of titanium derived from the first catalytic solid to the titanium derived from the second catalytic solid is at least 1, in particular at least 1.25, values of at least 1.50 being preferred. The ratio is usually not more than 10 and specifically not more than 5, values of not more than 4 being preferred.

The co-catalyst used in the first or in the second process may be any co-catalyst known in the art, in particular organoaluminium compounds. Examples which may be mentioned are trialkylaluminiums, in particular those in which the alkyl group contains up to 20 carbon atoms (preferably from 2 to 8 carbon atoms), such as triethylaluminium and triisobutylaluminium. Triethylaluminium is preferred.

According to a specific embodiment, the catalytic solid or solids used in the first and the second processes for the preparation of ethylene polymers according to the invention are prepared by reacting, in a first step, an oxygen-containing organomagnesium compound with an oxygen-containing organotitanium compound, and with, where appropriate, an oxygen-containing organozirconium compound until a liquid complex is obtained, and by treating the said liquid complex, in a second step, by means of a halogenated organoaluminium compound of general formula $AlR_nX_{3-n}$, in which R is a hydrocarbon radical, X is a halogen and n is less than 3, in order to precipitate the liquid complex as a catalytic solid.

For the purposes of the present invention, the expression "oxygen-containing organomagnesium compound" is understood to refer to compounds comprising at least one sequence of magnesium-oxygen-organic radical bonds per magnesium atom. The organic radical generally comprises up to 20 carbon atoms and more particularly up to 10 carbon atoms, preferably from 2 to 6 carbon atoms. The organic radical may be chosen from alkyl (linear or branched), alkenyl, aryl, cycloalkyl, arylalkyl, alkylaryl and acyl radicals and the substituted derivatives thereof. The best results are obtained with magnesium alkoxides. Magnesium dialkoxides are preferred, in particular magnesium diethoxide.

The expression "oxygen-containing organotitanium or organozirconium compound" is understood to refer to compounds comprising at least one sequence of titanium (or zirconium)-oxygen-organic radical bonds per titanium or zirconium atom. The organic radical is in accordance with those defined above for the oxygen-containing organomagnesium compounds. Tetravalent titanium or zirconium compounds are preferably used. Among the oxygen-containing organotitanium or organozirconium compounds which may be mentioned are the alkoxides, phenoxides, oxyalkoxides, condensed alkoxides, carboxylates and enolates. The best results are obtained with alkoxides. The preferred alkoxides are the titanium or zirconium tetraalkoxides, in particular titanium or zirconium tetrabutoxide.

The first step in the preparation of the catalytic solid or solids consists in preparing a liquid complex by reaction of the oxygen-containing organomagnesium compound with the oxygen-containing organotitanium compound and, when the catalytic solid also comprises zirconium, with the oxygen-containing organozirconium compound. The reaction may be performed in the presence of a diluent. The diluent is generally chosen from linear or branched alkanes or cycloalkanes containing up to 20 carbon atoms. Hexane is suitable for use.

The amount of the oxygen-containing organotitanium compound used is generally at least 0.01 mol of titanium per mole of magnesium used, in particular at least 0.02 mol, values of at least 0.05 mol being preferred. The amount is usually not more than 20 mol of titanium per mole of magnesium used, more precisely not more than 10 mol, values of not more than 5 mol being preferred. The amount of the oxygen-containing organozirconium compound used then depends on the desired Zr/Ti molar ratio.

The function of the second step in the preparation of the catalytic solid or solids, which is referred to as the precipitation step, is to reduce the valency of the transition metal and simultaneously to halogenate the oxygen-containing organomagnesium compound, the oxygen containing organotitanium compound and, where appropriate, the oxygen-containing organozirconium compound, that is to say to substitute the alkoxy groups present in these compounds with halogens, such that the liquid complex obtained after the first step is precipitated as a catalytic solid. The reduction and the halogenation are performed simultaneously using the halogen-containing organoaluminium compound which acts as a reductive halogenating agent bringing about the precipitation of a catalytic solid.

The treatment with the halogen-containing organoaluminium compound in the precipitation step is carried out by placing the liquid complex obtained after the first step in contact with the halogen-containing organoaluminium compound, and preferably by gradually adding the halogen-containing organoaluminium compound to the liquid complex.

The halogen-containing organoaluminium compound advantageously corresponds to the formula $AlR_nX_{3-n}$, in which R is a hydrocarbon radical comprising up to 20 carbon atoms and preferably up to 6 carbon atoms. The best results are obtained when R represents a linear or branched alkyl radical. X is generally chlorine. Preferably, n does not exceed 1.5 and more especially does not exceed 1. Ethylaluminium dichloride or isobutylaluminium dichloride is preferred.

The amount of halogen-containing organoaluminium compound to use is generally at least 0.5 mol of aluminium per mole of titanium and zirconium used, preferably at least 1 mol, values of at least 2 mol being the most common; it is commonly not more than 50 mol of aluminium per mole of titanium and zirconium used, in particular not more than 30 mol, values of not more than 20 mol being advantageous.

After the step of precipitation of the liquid complex using the halogen-containing organoaluminium compound, a catalytic solid is collected consisting of a homogeneous precipitate (the constituents being coprecipitated from a liquid complex) of an essentially amorphous mixture of a magnesium halide, a titanium halide and, where appropriate, a zirconium halide and optionally partially reduced and/or partially halogenated compounds. This relates to chemically bonded complexes, produced by chemical reactions and not the result of mixing or of adsorption phenomena. Indeed, it is impossible to dissociate any one of the constituents of these complexes by using purely physical separation methods.

The catalytic solid comprising titanium and zirconium obtained according to the specific mode of preparation described above also makes it possible, when it is used in a process for the polymerization of olefins in two reactors in series, to obtain polyolefins other than the ethylene polymers in accordance with the invention. The invention consequently also relates to a process for the polymerization of olefins, according to which the olefin is optionally polymerized with one or more co-monomers in two reactors in series, in the presence of a catalytic solid comprising titanium and zirconium in a Zr/Ti molar ratio of at least 2 and a co-catalyst, the first reactor being fed with olefin and optionally with co-monomer and/or with hydrogen, with catalytic solid and with co-catalyst, the reaction medium of the first reactor being transferred into the second reactor, and the second reactor also being fed with olefin and optionally with co-monomer and/or with hydrogen. The catalytic solid is prepared by reacting, in a first step, an oxygen-containing organomagnesium compound with an oxygen-containing organotitanium compound and with an oxygen-containing organozirconium compound until a liquid complex is obtained, and by treating the said liquid complex, in a second step, by means of a halogen-containing organoaluminium compound of general formula $AlR_nX_{3-n}$, in which R is a hydrocarbon radical, X is a halogen and n is less than 3, in order to precipitate the liquid complex as a solid catalytic complex. The process makes it possible to obtain particularly homogeneous polymers, with a high production efficiency.

The olefin may be chosen from olefins containing from 2 to 20 carbon atoms, and preferably from 2 to 6 carbon atoms, such as ethylene, propylene, 1-butene, 4-methyl-1-pentene and 1-hexene. Ethylene, 1-butene and 1-hexene are suitable for use. Ethylene is particularly preferred. The co-monomer may be chosen from the olefins mentioned above and from diolefins comprising from 4 to carbon atoms. It goes without saying that the comonomer introduced into the second reactor may be different from that which is introduced into the first reactor.

The mixture of the two catalytic solids used in the second process for the preparation of an ethylene polymer in accordance with the invention may also be used in other processes for the polymerization of olefins in a single reactor or in two reactors arranged in series. The invention thus also relates to a catalytic system for the polymerization of olefins comprising:

(a) a first catalytic solid consisting essentially of from 10 to 30% by weight of titanium, from 20 to 60% by weight of halogen, from 0.5 to 20% by weight of magnesium and from 0.1 to 10% by weight of aluminium, (b) a second catalytic solid consisting essentially of from 0.5 to 10% by weight of titanium, from 5 to 40% by weight of zirconium, from 20 to 80% by weight of halogen, from 1 to 30% by weight of magnesium and from 0.5 to 10% by weight of aluminium, and (c) a co-catalyst.

The use of a mixture of two catalytic solids makes it possible very rapidly to modify the properties of the polymer obtained by adjusting the composition of the said mixture.

In a third process for the preparation of ethylene polymers according to the invention, a catalytic solid containing chromium as active element is used on a support.

The third process for the preparation of the ethylene polymer in accordance with the invention consists more particularly in polymerizing ethylene optionally with one or more co-monomers in a single reactor in the presence of a catalytic solid comprising chromium on a support containing at least two constituents chosen from silica, alumina and aluminium phosphate, optionally in the presence of a co-catalyst and/or hydrogen.

A fourth process for the preparation of the ethylene polymer in accordance with the invention consists in polymerizing ethylene optionally with one or more co-monomers in two reactors arranged in series, in the presence of a catalytic solid comprising chromium on a support containing at least two constituents chosen from silica, alumina and aluminium phosphate, and a co-catalyst, the first reactor being fed with ethylene, optionally with co-monomer and/or with hydrogen, and with catalytic solid, the reaction medium of the first reactor being transferred into the second reactor, the second reactor also being fed with ethylene and optionally with co-monomer and/or with hydrogen, and the co-catalyst being present in at least one of the two reactors. The co-catalyst is advantageously used only in the second reactor.

The catalytic solid used in the third and fourth processes for the preparation of ethylene polymers according to the invention may be obtained in a manner which is known per se, by impregnation of the support powder with an aqueous or organic solution of a chromium compound, followed by drying in an oxidizing atmosphere. For this purpose, a chromium compound chosen from soluble salts such as the oxides, acetate, chloride, sulphate, chromate and bichromate in aqueous solution, or such as the acetylacetonate in organic solution, may be used. After impregnation of the support with the chromium compound, the impregnated support is usually activated by heating it to a temperature of from 400 to 1000° C. in order to convert at least part of the chromium into hexavalent chromium. The catalytic solid according to the invention may also be obtained by means of mechanical mixing of the support powder with a solid chromium compound, for example chromium acetylacetonate. Next, this mixture may be pre-activated at a temperature below the melting point of the chromium compound, before activating it conventionally as described above. In the catalytic solid used in the third and fourth processes, the chromium is generally present in a proportion ranging from 0.05 to 10% by weight, preferably from 0.1 to 5% by weight, more particularly from 0.25 to 2% by weight of chromium based on the total weight of the catalytic solid.

The co-catalyst which is optionally used in the third process and necessarily used in at least one reactor in the fourth process according to the invention may be chosen from organometallic compounds of aluminium or of boron. The best results are obtained with organoboron compounds since they make it possible to increase the catalytic activity. Organoboron compounds which may be used are trialkylborons in which the alkyl chains comprise up to 20 carbon atoms. In general, those are preferred in which the alkyl chains are straight and comprise up to 18 carbon atoms, more particularly from 2 to 8 carbon atoms. Triethylboron is preferred. The total amount of co-catalyst used is generally from 0.02 to 50 mmol per liter of solvent, of diluent or of reactor volume, and preferably from 0.2 to 2.5 mmol per 1.

The support used in the third and fourth processes for the preparation of an ethylene polymer in accordance with the invention advantageously has a specific surface of at least 100 m$^2$/g, in particular of at least 180 m$^2$/g, values of at least 220 m$^2$/g being the most favourable. The specific surface is most often not more than 800 m$^2$/g, more precisely not more than 700 m$^2$/g, values of not more than 650 m$^2$/g being the most common. The specific surface (SS) of the support is measured according to the BET volumetric method of British Standard BS 4359/1 (1984).

The support used in the third and fourth processes generally has a crystallization temperature of at least 700° C., for example such as at least 1000° C. The crystallization temperature of the support is determined by subjecting a sample of the support to a heat treatment at various temperatures (500° C., 700° C., 800° C., 950° C., 1050° C.), and by subsequently examining, after each heat treatment, this sample by X-ray diffraction.

The support used in the third and fourth processes usually has a pore volume of at least 1.5 cm$^3$/g, more especially of at least 2 cm$^3$/g, values of at least 2.2 cm$^3$/g being recommended. The pore volume is generally not more than 5 cm$^3$/g, in particular not more than 4.5 cm$^3$/g, values of not more than 4 cm$^3$/g being common. The pore volume (PV) is the sum of the pore volume consisting of pores with a radius less than or equal to 75 Å, measured by the nitrogen penetration method (BET) according to the volumetric technique described in British standard BS 4359/1 (1984), and of the pore volume measured by the mercury penetration method using a Poro 2000 type porosimeter marketed by Carlo Erba Co., according to Belgian standard NBN B 05-202 (1976). Good results may be obtained when the specific surface (SS) and the pore volume (PV) of the support correspond to the following relationship:

$$SS < (PV \times 564 - 358),$$

in which SS and PV are, respectively, the numerical values of the specific surface expressed in m$^2$/g and of the pore volume expressed in cm$^3$/g.

When it contains only two of the abovementioned constituents, the support used in the third and fourth processes advantageously contains silica and alumina in a molar ration of from 0.01 to 99 (preferably from 0.05 to 20), silica and aluminium phosphate in a molar ration from 0.01 to 99 (preferably from 0.05 to 20), alumina and aluminium phosphate in a molar ratio of from 0.01 to 99 (preferably from 0.05 to 20). Preferably, the support contains silica (X), alumina (Y) and aluminium phosphate (Z) in an (X):(Y):(Z) molar ratio of (10 to 95):(1 to 80):(1 to 85), and more particularly of (20 to 80): (1 to 60):(5 to 60). The support may also optionally contain titanium. The amount of titanium present in the support, expressed as a molar percentage of TiO$_2$ relative to the support of the catalytic solid containing silica, alumina, aluminium phosphate and titanium dioxide, is generally at least equal to 0.1 mol %, preferably to 0.5 mol %; values of at least 1 mol % being the most common. The amount of titanium, expressed as a molar percentage of TiO$_2$, usually does not exceed 40 mol % and more particularly does not exceed 20 mol %, values of not more than 15 mol % being recommended.

The support used in the third and fourth processes using catalytic solids containing chromium is generally in the form of a powder whose grains are from 20 to 200 μm in diameter. It usually has an apparent density greater than or equal to 50 kg/m$^3$, in particular to 100 kg/m$^3$; it is generally at most equal to 500 kg/m3, typically to 300 kg/m$^3$. The apparent density is measured by free flow according to the following procedure: the support powder to be analysed is poured into a cylindrical container with a capacity of 50 cm$^3$, while taking care not to pack it down, from a hopper whose lower edge is arranged 20 mm above the upper edge of the container. The container filled with the powder and levelled off using a rectilinear blade is then weighed, the tare of the weight recorded is subtracted and the result obtained (expressed in g) divided by 50.

A specific process for obtaining the support used in the third and fourth processes consists in mixing, in a first step, an alcohol, water, a silicon alkoxide and an acid in amounts such that the water/silicon molar ratio is from 2 to 50, in adding to the hydrolysis medium thus obtained, in a second step, an acidic solution of an aluminium compound and a solution of a source of phosphate ions, and, in a third step, a precipitation agent in order to obtain a precipitate, in washing, in a fourth step, the precipitate thus obtained with water and then by means of an organic liquid, and then in drying it, in a fifth step, by distillation until a powder is obtained, and in calcining the powder.

The silicon alkoxide used in the first step of the specific process for obtaining the support preferably comprises an alkoxy group of 1 to 20 carbon atoms. Alkoxy groups of the aliphatic type are recommended, especially those of the saturated, unsubstituted aliphatic type. Silicon alkoxides which are suitable are silicon tetraethoxide, tetramethoxide and tetraisopropoxide. Silicon tetraethoxide is preferred.

The function of the alcohol used in the first step of the specific process for obtaining the support is to dissolve the silicon alkoxide. Linear aliphatic alcohols are preferred. Ethanol, isopropanol and methanol may be mentioned as examples. Ethanol is preferred. An alcohol whose hydrocarbon group corresponds to that of the alkoxy group of the silicon alkoxide used is advantageously used.

The first step is advantageously performed at acid pH and comprises, on the one hand, the addition of water, the acid, the silicon alkoxide and the alcohol, the temperature during the addition being below or equal to 30° C. (in particular below 20° C., typically about 100° C., temperatures above 0° C. being recommended), and, on the other hand, a maturation of the reaction medium thus obtained at a temperature at least equal to 20° C. and below the boiling point of the medium (for example from 30 to 100° C., temperatures of from 40 to 80° C. being the most common and those from 50° to 70° C. being recommended), so as to substitute at least some of the alkoxy groups of the silicon alkoxide by hydroxyl groups, without gelation or a precipitation of silica taking place. In the first step, the pH of the reaction medium is generally below 3, preferably from 0.5 to 2.5, for example equal to about 1. The acid used in the first step may be inorganic or organic in nature. It may, for example, be hydrochloric acid, nitric acid, phosphoric acid or sulphuric acid. Hydrochloric acid is particularly suitable. The maturation is preferably performed at a temperature above that of addition of the reactants. The function of the maturation is to allow partial condensation and hydrolysis of the silicon alkoxide.

The second step of the specific process for obtaining the support consists in adding, to the medium obtained after the first step, an acidic solution of an aluminium compound and a solution of a source of phosphate ions. The aluminium compound may be chosen from inorganic aluminium salts and aluminium alkoxides. Aluminium alkoxides containing unsubstituted saturated linear aliphatic groups are recommended. The aliphatic groups preferably contain from 1 to 20 carbon atoms. Aluminium alkoxides whose alkoxy group corresponds to that of the silicon alkoxide used are particularly suitable. Aluminium nitrate and aluminium chloride are particularly preferred. For the purposes of the present invention, the term source of phosphate ions is understood to denote any compound capable of forming phosphate ions. Inorganic phosphate salts, phosphate ether salts and phosphoric acid are especially recommended. Phosphoric acid is preferably used. In the second step of the specific process for obtaining the support, it is preferred to perform the process very slowly in order to prevent the medium from heating up, for example at a temperature below 30° C., typically below or equal to 20° C., for example between 0 and 10° C.

The third step of the specific process for obtaining the support consists in forming a precipitate under the effect of a precipitation agent which may be chosen from any compound capable of bringing about a co-precipitation of the reactants used in the first and second steps (the hydrolysed and partially condensed silicon alkoxide obtained after the first step and defined above, the aluminium compound and the source of phosphate ions) in the form of a mixed oxide of silicon, aluminium and phosphorus. Examples of precipitation agents which may be mentioned are ethylene oxide, ammonium carbonate and ammonium hydroxide. Aqueous ammonium hydroxide solution is preferably used. The pH of the co-precipitation medium is generally above or equal to 5, typically above or equal to 6; it is usually below 11, values of below 10 being recommended. The pH is preferably kept constant at a value of from 6 to 10, for example 8, throughout the co-precipitation.

In the fourth step of the specific process for obtaining the support, the washing with water generally consists in placing the precipitate in contact with an amount of water sufficient to remove the impurities contained in the precipitate, and in subsequently removing at least some of this amount of water by any suitable known means, for example by centrifugation or by filtration. The process is preferably performed by centrifugation. Next, the water-washed precipitate is subjected to washing by means of an organic liquid, the function of which is to remove the water which impregnates the precipitate. The organic liquid preferably has an evaporation temperature below 120° C., typically below 100° C., for example from 70 to 90° C. Organic liquids which can be used are alcohols, ethers or mixtures thereof. Alcohols are preferred, particularly those comprising from 1 to 4 carbon atoms. Isopropanol is suitable for use.

The washed precipitate is subsequently subjected, in a fifth step of the specific process for obtaining the support, to a drying operation by spraying or by distillation, preferably azeotropic distillation, so as to evaporate the water and the organic liquid not removed above, until a powder of the support is obtained.

After the drying, a support powder is collected and is subjected to a calcination. The function of the calcination is to extract, at high temperature, the organic impurities from the powder. It is generally continued until the weight of the powder remains constant over time, while at the same time avoiding crystallization of the powder. The calcination may be carried out under air (preferably under dry air) in a fluidized bed at a temperature below the crystallization temperature of the powder. The temperature is generally from 300 to 1500° C., typically from 350 to 1000° C., preferably from 400 to 600° C.

When a support chosen from $SiO_2$—$AlPO_4$, $Al_2O_3$—$AlPO_4$ binary supports and from $SiO_2$—$Al_2O_3$—$AlPO_4$ ternary supports as described above is used in a process for the polymerization of olefins in two reactors in series, it is also possible to obtain polyolefins other than the ethylene polymer in accordance with the invention. Consequently, the invention also relates to a process for the polymerization of olefins, according to which the olefin is optionally polymerized with one or more comonomers in two reactors arranged in series, in the presence of a catalytic solid comprising chromium on a support chosen from the $SiO_2$—$AlPO_4$, and $Al_2O_3$—$AlPO_4$ binary supports and $SiO_2$—$Al_2O_3$—$AlPO_4$ ternary supports, and a cocatalyst, the first reactor being fed with ethylene and optionally with co-monomer and/or with hydrogen, as a catalytic solid, the reaction medium of the first reactor being transferred into the second reactor, the second reactor also being fed with ethylene and optionally with co-monomer and/or with hydrogen, and the co-catalyst being present in at least one of the two reactors.

The polymerization processes of the invention may be carried out according to any known process, in solution in a solvent which may be the olefin itself in the liquid state, or in suspension in a hydrocarbon diluent, or alternatively in the gas phase. Good results are obtained in suspension polymerizations.

The principle of a polymerization in two reactors arranged in series is that described in patent application EP 603,935

(Solvay). The plant may, obviously, comprise more than two reactors connected in series. The processes of polymerization in two reactors in series are advantageously performed so as to use, in the second reactor, conditions of polymerization (temperature, concentration of transfer agent such as hydrogen, concentration of optional co-monomer, concentration of optional co-catalyst, etc.) which are different from those used in the first reactor. Thus, the polymer produced in the second reactor has a different melt index from that produced in the first reactor. Arrangement may thus be made for the melt index obtained in the first reactor to be lower than that obtained in the second reactor. As a variant, a melt index which is higher in the first reactor than in the second reactor may be obtained.

The examples which follow are intended to illustrate the invention. The meaning of the symbols used in these examples, the units expressing the magnitudes mentioned and the methods for measuring these magnitudes are explained below.

$MI_2$ = melt index of the polyethylene, measured at 190° C. under a 2.16 kg load according to ASTM standard D 1238 (condition E) (1986).
$MI_5$ = melt index of the polyethylene, measured at 190° C. under a 5 kg load according to ASTM standard D 1238 (condition P) (1986).
SD = standard density of the polyethylene, expressed in kg/m$^3$ and measured according to ISO standard 1183 (1987).
η = dynamic viscosity of the polyethylene, expressed in dPa s and measured at a rate gradient of 100 s$^{-1}$ at 190° C.
ESCR = resistance to crazing under stress, expressed in hours and measured by the following method: Ten plates 125 mm × 12.7 mm × 3.2 mm in size are pressed from a sheet of ethylene polymer. Two notches are made therein, the first 60 mm from one end of the plate and the second 15 mm from the other end of the plate. The notched plates are subjected to a constant flexural force of 7.36 N, corresponding to a stress less than the stress at the plastic flow threshold, and are simultaneously immersed in a surfactant solution comprising 3 ml of nonylphenoxypoly(ethyleneoxy) ethanol per liter of water at a temperature of 60° C. The time after which the test samples break is noted and the average time corresponding to the breaking of 50% of the test samples is calculated.
$R_B$ = Blow-up ratio of the ethylene polymer (no units). The measurement method consists in extruding, at 190° C. and at a rate gradient of 100 s$^{-1}$, the ethylene polymer through a die 30 mm in length and 2 mm in diameter at a constant rate of extrusion, and in measuring how far the piston needs to be displaced in order to extrude a rod 70 mm in length. The blow-up ratio is defined by the relationship $R_B = 0.5707 \sqrt{e}$, in which e represents the displacement of the piston expressed in mm. The cylinder and the piston of the rheometer used for this measurement satisfy the criteria of that used to measure the melt index according to ASTM standard D 1238 (1986).
P = Production efficiency of the catalytic solid, expressed in kg of polyethylene produced per gram of titanium used.

EXAMPLE 1 (reference)

In this example, an ethylene polymer was prepared in two reactors in series using a titanium catalyst according to the procedure described in patent application EP 603,935, and its blow-up ratio and resistance to crazing under stress were measured.

A. Preparation of the Catalytic Solid

Magnesium diethoxide is reacted for 4 hours at 150° C. with titanium tetrabutoxide in amounts such that the molar ratio of titanium to magnesium is equal to 2. Next, the reaction product thus obtained was chlorinated and precipitated by placing it in contact with a solution of ethylaluminium dichloride in an amount such that the molar ratio of aluminium to magnesium is equal to 6.5, for 90 minutes at 45° C. The solid thus obtained comprised 15.8% by weight of Ti, 36.0% by weight of Cl, 2.2% by weight of Al and 4.4% by weight of Mg.

B. Polymerization of Ethylene in Two Reactors

Ethylene was polymerized in a plant comprising two reactors arranged in series. Hexane, triethylaluminium as co-catalyst, ethylene and hydrogen in a hydrogen/ethylene molar ratio of 0.27, and the catalytic solid obtained in A were introduced continuously into the first reactor. The temperature was kept constant at a value of 85° C. The polymerization medium of the first reactor was removed continuously from the first reactor and transferred into the second reactor, which was also fed with ethylene, with hydrogen in a hydrogen/ethylene molar ratio of 0.0085, and with butene in a butene/ethylene molar ratio of 0.31. The temperature in the second reactor was 70° C. The production efficiency P was 200. The polymer obtained had the following characteristics:

$MI_5 = 1.3$ $\eta = 15,400$ $R_B = 1.34$ $ESCR = 128$ $SD = 956$

The polymer obtained has a blow-up ratio of less than 1.4, whereas the ethylene polymers according to the invention have a blow-up ratio of at least 1.4.

EXAMPLE 2 (reference)

In this example, an ethylene polymer was prepared in a single reactor using a titanium and zirconium catalyst according to the procedure described in Belgian patent BE 840,378, and its blow-up ratio and resistance to crazing under stress were measured.

A. Preparation of the Catalytic Solid

Magnesium diethoxide was reacted, for 4 hours at 150° C., with titanium tetrabutoxide and with zirconium tetrabutoxide in amounts such that the Ti/Mg molar ratio is equal to 0.6 and that the Zr/Ti molar ratio is equal to 1.2. The reaction product thus obtained was then chlorinated and precipitated by placing it in contact with a solution of isobutylaluminium dichloride in an amount such that the Al/Mg molar ratio is 11, at 45° C. The catalytic solid was mixed with titanium tetraisopropoxide in a proportion of 150 g per kg of catalytic solid. The solid thus obtained comprised 6.4% by weight of Ti, 12.6% by weight of Zr, 55.2% by weight of Cl, 2.5% by weight of Al and 5.8% by weight of Mg.

B. Polymerization of Ethylene in a Single Reactor

Ethylene was polymerized in a single reactor. Hexane, triisobutylaluminium as co-catalyst, ethylene and hydrogen in a hydrogen/ethylene molar ratio of 0.09, and the catalytic solid obtained in A were introduced therein. Butene was introduced in a butene/ethylene molar ratio of 0.07. The temperature was kept constant at a value of 87° C. The production efficiency P was 100. The polymer obtained had the following characteristics:

$MI_5 = 1.1$ $\eta = 18,300$ $R_B = 1.59$ $ESCR = 38$ $SD = 954.$

The polymer obtained has a resistance to crazing under stress of less than 55 h, whereas the ethylene polymers according to the invention have a resistance to crazing under stress of at least 55 h.

EXAMPLE 3 (reference)

In this example, an ethylene polymer was prepared in a single reactor using a chromium catalyst on a silica support and its blow-up ratio and resistance to crazing under stress were measured.

A. Preparation of the Catalytic Solid

The commercial catalyst EP30X from the company Crosfield comprising 1% by weight of Cr supported on silica was used. The catalyst was calcined in a fluidized bed at 760° C. for 12 hours under dry air, and the catalytic solid was collected.

B. Polymerization of Ethylene in a Single Reactor

Ethylene was polymerized in a single reactor. Isobutane, ethylene and hexene in a hexene/ethylene molar ratio of 0.017, and the catalytic solid obtained in A were introduced therein. The total pressure in the reactor and the temperature were kept constant at a value of 4.2 MPa and 103° C. respectively. The polymer obtained had the following characteristics:

$MI_5 = 0.86$ $\eta = 17,900$ $R_B = 1.67$ $ESCR = 24$ $SD = 954.0.$

The polymer obtained has a resistance to crazing under stress of less than 55 h, whereas the ethylene polymers according to the invention have a resistance to crazing under stress of at least 55 h.

EXAMPLE 4 (In accordance with the invention)

In this example, an ethylene polymer in accordance with the invention was manufactured using the first preparation process according to the invention.

A. Preparation of the Catalytic Solid

Magnesium diethoxide was reacted, for 4 hours at 150° C., with titanium tetrabutoxide and with zirconium tetrabutoxide in amounts such that the Ti/Mg molar ratio is equal to 0.4 and that the Zr/Ti molar ratio is equal to 3. The reaction product thus obtained was then chlorinated and precipitated by placing it in contact, at 45° C., with a solution of isobutylaluminium dichloride in an amount such that the Al/Mg molar ratio is 8.4. The solid thus obtained comprised 4.4% by weight of Ti, 14.9% by weight of Zr, 50.2% by weight of Cl, 2.4% by weight of Al and 8.0% by weight of Mg.

B. Polymerization of Ethylene in Two Reactors

Ethylene was polymerized in a plant comprising two reactors arranged in series. Hexane, triethylaluminium as co-catalyst, ethylene and hydrogen in a hydrogen/ethylene molar ratio of 0.37, and the catalytic solid obtained in A were introduced continuously into the first reactor. The temperature was kept constant at a value of 85° C. The polymerization medium of the first reactor was removed continuously from the first reactor and transferred into the second reactor, which was also fed with ethylene, with hydrogen in a hydrogen/ethylene molar ratio of 0.0125, and with butene in a butene/ethylene molar ratio of 0.2. The temperature in the second reactor was 80° C. The production efficiency P was 213. The weight ratio of the polymer obtained in the first reactor to the polymer obtained in the second reactor was 45.6/54.4. The polymer obtained had the following characteristics:

$MI_5 = 1.5$ $\eta = 12,800$ $R_B = 1.49$ $ESCR = 143$ $SD = 955.$

EXAMPLE 5 (In accordance with the invention)

In this example, an ethylene polymer in accordance with the invention was manufactured by means of the second preparation process according to the invention.

A. Preparation of the Mixture of Catalytic Solids

A.1. Preparation of the First Catalytic Solid Containing Titanium

Magnesium diethoxide was reacted, for 4 hours at 150° C., with titanium tetrabutoxide in amounts such that the molar ratio of titanium to magnesium is equal to 2. The reaction product thus obtained was then chlorinated and precipitated by placing it in contact with a solution of ethylaluminium dichloride in an amount such that the Al/Mg molar ratio is 6.5, for 90 minutes at 45° C. The solid thus obtained comprised 15.8% by weight of Ti, 36.0% by weight of Cl, 2.2% by weight of Al and 4.4% by weight of Mg.

A.2. Preparation of the Second Catalytic Solid Containing Titanium and Zirconium Magnesium diethoxide was reacted, for 4 hours at 150° C., with titanium tetrabutoxide and with zirconium tetrabutoxide in amounts such that the Ti/Mg molar ratio is equal to 0.6 and that the Zr/Ti molar ratio is equal to 2. The reaction product thus obtained was then chlorinated and precipitated by placing it in contact with a solution of isobutylaluminium dichloride in an amount such that the Al/Mg molar ratio is 14, first at 45° C. and then at 60° C. The solid thus obtained comprised 5.4% by weight of Ti, 16.3% by weight of Zr, 52.6% by weight of Cl, 2.4% by weight of Al and 4.1% by weight of Mg.

A.3. Preparation of the Mixture

The solid obtained in A was mixed with the solid obtained in B in a proportion of amounts such that the molar ratio of titanium derived from the first catalytic solid to the titanium derived from the second catalytic solid is 1.5.

B. Polymerization of Ethylene in Two Reactors

Ethylene was polymerized in a plant comprising two reactors arranged in series. Hexane, triethylaluminium as co-catalyst, ethylene and hydrogen in a hydrogen/ethylene molar ratio of 0.32, and the mixture of catalytic solids obtained in A.3 were introduced continuously into the first reactor. The total pressure in the reactor and the temperature were kept constant at the value of 3.2 MPa and 85° C. respectively. The polymerization medium of the first reactor was removed continuously from the first reactor and transferred into the second reactor, which was also fed with ethylene, with hydrogen in a hydrogen/ethylene molar ratio of 0.0185, and with butene in a butene/ethylene molar ratio of 0.35. The total pressure in the reactor was 3.0 MPa. The temperature in the second reactor was 750° C. The production efficiency P was 111. The polymer obtained had the following characteristics:

$MI_5 = 0.32$ $\eta = 15,300$ $R_B = 1.43$ $ESCR = 109$ $SD = 956.4.$

EXAMPLE 6 (In accordance with the invention)

In this example, an ethylene polymer in accordance with the invention was manufactured by means of the third preparation process according to the invention.

A. Preparation of the Catalytic Solid

A.1. To a solution of silicon tetraethoxide and ethanol was added, at a temperature of 10° C., a solution of water and 1M hydrochloric acid so as to obtain a pH of 1. The amounts used were: 34.7 g of silicon tetraethoxide, 41.7 g of ethanol, 18.9 g of water and 11.5 g of hydrochloric acid. The reaction medium thus obtained was then subjected to a maturation at 60° C. for 2 hours.

A.2. In parallel, an aqueous solution containing 62.5 g of aluminium nitrate hydrate, 17.1 g of phosphoric acid and 33.3 g of water was prepared. The solution thus obtained was then added to the reaction medium obtained in A.1., with vigorous stirring at 10° C.

A.3. To 500 g of aqueous ammonium hydroxide solution of pH 8, thermostatically adjusted to 10° C., was added the mixture obtained in A.2, while keeping the pH constant at a value of 8, in order to effect gelation. The gel was subjected to a maturation at pH 8 for 2 hours, with stirring at 60° C.

A.4. The gel was subsequently washed with water and then using isopropanol and a suspension of the gel was collected.

A.5. The gel obtained in A.4 was dried by spraying until a powder was obtained.

A.6. The powder obtained in A.5 was calcined in a fluidized bed flushed with dry air, for 4 hours at 500° C. A powder was collected comprising: 15.6% by weight of Si 15.1% by weight of Al 16.3% by weight of P A.7. The support obtained in A.6 was mixed with chromium acetylacetonate in an amount such that the mixture comprises 0.7% by weight of chromium. The mixture thus obtained was then treated in a fluidized bed at 150° C. for 2 hours under a stream of dry air. It was then calcined in the fluidized bed at 600° C. for 10 hours under dry air and the catalytic solid was collected, which solid had the following characteristics: specific surface of 407 $m^2/g$ pore volume of 2.20 $cm^3/g$ crystallization temperature above 700° C., B. Polymerization of Ethylene in a Single Reactor Ethylene was polymerized in a single reactor. Isobutane, ethylene and hydrogen in a hydrogen/ethylene molar ratio of 0.046, and hexene in an ethylene/hexene molar ratio of 0.003, and the catalytic solid obtained in A were introduced continuously therein. The total pressure in the reactor and the temperature were kept constant at a value of 3.8 MPa and 107° C. respectively. The polymer obtained had the following characteristics:

$MI_5 = 0.58$ $\eta = 18,000$ $R_B > 1.5$ $ESCR = 111$ $SD = 955.8.$

EXAMPLE 7 (In accordance with the invention)

In this example, an ethylene polymer in accordance with the invention was manufactured by means of the fourth preparation process according to the invention.

A. Preparation of the Catalytic Solid

The catalytic solid of Example 6 was used, which was calcined in a fluidized bed at 815° C. for 16 hours under dry air.

B. Polymerization of Ethylene in Two Reactors

The process of polymerization in two successive reactors was simulated in a single reactor in two separate steps by an intermediate release of pressure and reinitialization of the operating parameters.

Polymerization of a first polymer (i):

108 mg of catalyst are introduced into a 3-liter autoclave fitted with a stirrer. The polymerization temperature is brought to 80° C. and is kept constant during the polymerization. Ethylene was then introduced therein. The partial pressure of ethylene is kept constant at a value of 5.8 bar. 6.7 g of hexene are introduced, followed by 0.67 g every time 50 g of PE are produced (in order to keep a constant hexene/ethylene ratio). The hexene/ethylene ratio is 0.11. After 68 minutes, the autoclave was degassed to a pressure of 6 bar. 162 g of polymer (i) were obtained.

Polymerization of a second polymer (ii):

1 liter of isobutane were added to the autoclave.

The temperature was brought to 98° C. and was kept constant throughout the polymerization. A single dose of hydrogen was then introduced in order to obtain a hydrogen/ethylene molar ratio of 0.22 in the liquid phase. The cocatalyst (triethylboron) was then introduced into the autoclave in an amount such that the triethylboron/chromium molar ratio is equal to 3.8. The partial pressure of ethylene was kept constant at a value of 3.5 bar until an additional amount of 162 g of polymer (ii) was obtained. After degassing, 324 g of a composition of the polymers (i) and (ii) was collected. The catalyst had an activity of 33,000 and 93,000 respectively in blocks (i) and (ii). The activity is expressed in g PE/g cat.h [$C_2H_4$]. The properties of the polymer, after granulation, are as follows:

$MI_5 = 0.49$ $\eta = 14,000$ $R_B = 1.9$ $SD = 954.4.$

What is claimed is:

1. Process for the polymerization of olefins, in which the olefin is polymerized, optionally with one or more co-monomers, in two reactors arranged in series, in the presence of a catalytic solid comprising chromium on a support which comprises a $SiO_2$—$Al_2O_3$—$AlPO_4$ ternary support, and a co-catalyst, the first reactor being fed with ethylene and optionally with a first co-monomer and/or with hydrogen, and with catalytic solid, the reaction medium of the first reactor being transferred into the second reactor, the second reactor also being fed with ethylene and optionally with at least one second co-monomer which is the same or different from said first comonomer and/or with hydrogen, and the co-catalyst being present in at least one of the two reactors.

2. Process according to claim 1, wherein the co-catalyst is used only in the second reactor.

3. Process according to claim 1, wherein the co-catalyst is chosen from organoboron compounds.

4. Process according to claim 1, wherein the co-catalyst is a trialkylboron, the alkyl radical comprising up to 20 carbon atoms.

5. Process according to claim 1, wherein the catalytic solid comprises from 0.05 to 10% by weight of chromium.

6. Process according to claim 1, wherein the support contains silica (X), alumina (Y) and aluminium phosphate (Z) in an (X):(Y): (Z): molar percentage of (10 to 95):(1 to 80):(1 to 85).

7. Process according to claim 1, wherein the support has a pore volume of at least 1.5 $cm^3/g$.

8. Process accordingly to claim 1, wherein the olefin is ethylene.

9. Process according to claim 1, wherein the co-monomer is chosen from olefins and from diolefins comprising from 4 to 20 carbon atoms.

10. Process for the polymerization of olefins, in which the olefin is polymerized, optionally with one or more co-monomers, in two reactors arranged in series, in the presence of a catalytic solid comprising chromium on a support which comprises a $SiO_2$—$Al_2O_3$—$AlPO_4$ ternary support, and a co-catalyst, the first reactor being fed with ethylene and optionally with a first co-monomer and/or with hydrogen, and with catalytic solid, the reaction medium of the first reactor being transferred into the second reactor, the second reactor also being fed with ethylene and optionally with at least one second co-monomer which is the same or different from said first comonomer and/or with hydrogen, and the co-catalyst being present in at least one of the two reactors; and recovering a polymer characterized by ESCR of greater than 55 hours with a blow-up ratio of at least 1.4, wherein the blow-up ratio is measured by extruding, at 190 degrees C. and at a rate gradient of 100 s-1, the ethylene polymer through a die 30 mm in length and 2 mm in diameter at a constant rate of extrusion, and in measuring how far the piston needs to be displaced in order to extrude a rod 70 mm in length; said blow-up ratio is defined by RB wherein RB=0.5707√e in which e represents the displacement of the piston expressed in mm and wherein the cylinder and the piston satisfy the criteria of that used to measure the melt index according to ASTM D1238 (1986).

11. Process according to claim 10, wherein the co-catalyst is used only in the second reactor.

12. Process according to claim 10, wherein the co-catalyst is chosen from organoboron compounds.

13. Process according to claim 10, wherein the co-catalyst is a trialkylboron, the alkyl radical comprising up to 20 carbon atoms.

14. Process according to claim 10, wherein the catalytic solid comprises from 0.05 to 10% by weight of chromium.

15. Process according to claim 10, wherein the support contains silica (X), alumina (Y) and aluminium phosphate (Z) in an (X):(Y):(X): molar percentage of (10 to 95):(1 to 80):(1 to 85).

16. Process according to claim 10, wherein the support has a pore volume of at least 1.5 $cm^3/g$.

17. Process accordingly to claim 10, wherein the olefin is ethylene.

18. Process according to claim 10, wherein the co-monomer is chosen from olefins and from diolefins comprising from 4 to 20 carbon atoms.

* * * * *